United States Patent
Somasundaram et al.

(10) Patent No.: US 9,301,284 B2
(45) Date of Patent: *Mar. 29, 2016

(54) RRC MESSAGES AND PROCEDURES

(71) Applicant: InterDigital Technology Corporation, Wilmington, DE (US)

(72) Inventors: Shankar Somasundaram, Sunnyvale, CA (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,704

(22) Filed: Mar. 28, 2014

(65) Prior Publication Data

US 2014/0243003 A1  Aug. 28, 2014

Related U.S. Application Data

(63) Continuation of application No. 13/764,528, filed on Feb. 11, 2013, now Pat. No. 8,688,125, which is a continuation of application No. 12/133,514, filed on Jun. 5, 2008, now Pat. No. 8,374,609.

(60) Provisional application No. 60/942,069, filed on Jun. 5, 2007.

(51) Int. Cl.
*H04W 36/00* (2009.01)
*H04W 72/04* (2009.01)
(Continued)

(52) U.S. Cl.
CPC .......... *H04W 72/0406* (2013.01); *H04W 24/10* (2013.01); *H04W 76/04* (2013.01); *H04W 88/08* (2013.01)

(58) Field of Classification Search
CPC ..... H04W 36/08; H04W 36/12; H04W 36/14; H04W 36/18; H04W 36/30; H04W 36/32; H04W 36/0055; H04W 36/0083; H04W 64/00; H04W 8/12; H04W 8/15; H04W 8/26; H04W 8/83
USPC .................. 455/67.11, 436–438, 432.1, 440; 370/337, 338, 331, 332
See application file for complete search history.

(56) References Cited

U.S. PATENT DOCUMENTS 6,469,995 B1  10/2002  Voyer et al.
6,810,019 B2  10/2004  Steudle
(Continued)

FOREIGN PATENT DOCUMENTS

EP  1 439 668  7/2004
JP  2001-268642  9/2001

OTHER PUBLICATIONS

Ericsson, "Idle Gaps for Handover Measurements in E-UTRAN," 3GPP TSG-RAN WG2 (Radio) Meeting #54, R2-062134 (Aug. 28-Sep. 1, 2006).
(Continued)

*Primary Examiner* — Temica M Beamer
(74) *Attorney, Agent, or Firm* — Volpe and Koenig, P.C.

(57) ABSTRACT

A method and apparatus for radio resource control (RRC) messaging. A method in a wireless communication system includes receiving, at a wireless transmit/receive unit (WTRU) an RRC change command including a plurality of commands from a Node B and receiving, at the Node B, an RRC change response from the WTRU, wherein the RRC change command includes a command for performing a measurement gap configuration procedure and a command for performing a measurement gap activation procedure.

16 Claims, 2 Drawing Sheets

(51) Int. Cl.
*H04W 24/10* (2009.01)
*H04W 76/04* (2009.01)
*H04W 88/08* (2009.01)

(56) References Cited

U.S. PATENT DOCUMENTS

| | | | |
|---|---|---|---|
| 6,845,238 | B1 | 1/2005 | Muller |
| 7,003,296 | B2 | 2/2006 | de Montoglfier |
| 7,092,373 | B2 | 8/2006 | Parantainen et al. |
| 8,374,609 | B2 | 2/2013 | Somasundaram et al. |
| 8,588,800 | B2 | 11/2013 | Iwamura et al. |
| 2003/0045271 | A1 | 3/2003 | Carey et al. |
| 2003/0108027 | A1 | 6/2003 | Kim et al. |
| 2006/0135074 | A1 | 6/2006 | Petrovic et al. |
| 2007/0047452 | A1 | 3/2007 | Lohr et al. |
| 2007/0080784 | A1 | 4/2007 | Kim et al. |
| 2008/0076427 | A1 | 3/2008 | Huang et al. |

OTHER PUBLICATIONS

Huawei, "Measurement Gap Scheduling in HO Procedure in LTE,"3GPP TSG RAN2#52, R-2060860 (Mar. 27-31, 2006).

Samsung, "RRC Messages and Procedures", 3GPP TSG-RAN2 Meeting #57bis, R2-071375, (St. Julian's, Malta, Mar. 26-30, 2007).

Third Generation Partnership Project, "Technical Specification Group Radio Access Network; Evolved Universal Terrestrial Radio Acces (E-UTRA) Radio Resource Control (RRC); Protocol Specification (Release 8)", 3GPP TS 36.331 V8 1.0 (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8 1.0 (Dec. 2007).

Ericsson, "Idle Gaps for Handover Measurements in E-UTRAN," 3GPP TSG-RAN WG2 (Radio) Meeting #54, R2-062134 (Aug. 28-Sep. 1, 2006).

Huawei, "Measurement Gap Scheduling in HO Procedure in LTE," 3GPP TSG RAN2 #52, R2-060860 (Mar. 27-31, 2006).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.0.0 (Dec. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.0.0 (Mar. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.4.0 (Mar. 2008).

Samsung, "Text proposal for RRC chapters: Procedures and Protocol data units," 3GPP TSG-RAN2 Meeting #58, R2-072207, Kobe, Japan (May 7-11, 2007).

Nokia Siemens Networks et al., "Measurement Gap Creation," 3GPP TSG-RAN WG2 Meeting #58, R2-071728, Kobe, Japan (May 7-11, 2007).

Panasonic, "Corrections to non-package1&2 TCs in clause 8.4 of TS 34.123-1," 3GPP TSG-T1/SIG Meeting #24, T1S-020363, Yokohama, Japan (Jul. 29-31, 2002).

Third Generation Partnership Project, "Technical Specification Group Radio Access Network; Evolved Universal Terrestrial Radio Access (E-UTRA); Requirements for support of radio resource management (Release 8)," 3GPP TS 36.133 V8.1.0 (Mar. 2008).

RRC MESSAGES AND PROCEDURES

CROSS REFERENCE TO RELATED APPLICATIONS

This application is a continuation of U.S. patent application Ser. No. 13/764,528, filed Feb. 11, 2013, which issues as U.S. Pat. No. 8,688,125 on Apr. 1, 2014, which is a continuation of U.S. patent application Ser. No. 12/133,514, filed Jun. 5, 2008, which issued as U.S. Pat. No. 8,374,609 on Feb. 12, 2013, which claims the benefit of U.S. Provisional Application No. 60/942,069, filed Jun. 5, 2007, the contents of which are hereby incorporated by reference herein.

FIELD OF INVENTION

The present invention is related to wireless communication systems.

BACKGROUND

The Third Generation Partnership Project (3GPP) has recently initiated the Long Term Evolution (LTE) program to bring new technology, new network architecture and configurations and new applications and services to the wireless cellular network in order to provide improved spectral efficiency, reduced latency, faster user experiences and richer applications and services with less cost. LTE aims at realizing an Evolved Universal Terrestrial Radio Access Network (E-UTRAN).

There have been attempts to identify radio resource control (RRC) messages for LTE, as well as the high level structure of the procedural specification. In order to achieve a concise specification, some of those messages have been grouped together to provide similar functionality. Table 1 shows an example of grouping of these messages.

TABLE 1

Message Groupings

| No | Message | Details | Comment/UMTS equivalents |
|---|---|---|---|
| 1 | System Information Block 1 . . . n | Downlink(DL), Broadcast Channel (BCH) | SYSTEM INFORMATION BLOCK 1 . . . N |
| 2 | Paging | DL, Paging Channel (PCH) | PAGING TYPE 1/2 |
| 3 | Radio connection request | Uplink (UL) Synch Channel (SCH) | RRC CONNECTION REQUEST A specific message seems needed for some scenarios considering the size constrains for the initial uplink message |
| 4 | Measurement report | UL-SCH | MEASUREMENT REPORT Introduction of a more general purpose 'Radio connection change request' may still be considered |
| 5 | Radio connection change command | DL-SCH | RADIO BEARER SETUP RADIO BEARER RELEASE RRC CONNECTION SETUP RRC CONNECTION RELEASE XXXX RECONFIGURATION Possibly also covering: CELL UPDATE CONFIRM HANDOVER FROM UTRAN COMMAND MEASUREMENT CONTROL SECURITY MODE COMMAND UTRAN MOBILITY INFORMATION |
| 6 | Radio connection change complete | UL-SCH | RADIO BEARER SETUP COMPLETE RADIO BEARER RELEASE COMPLETE RRC CONNECTION COMPLETE RRC CONNECTION COMPLETE XXXX RECONFIGURATION COMPLETE Possibly also covering: HANDOVER FROM UTRAN COMPLETE HANDOVER TO UTRAN COMPLETE SECURITY MODE COMPLETE UTRAN MOBILITY INFORMATION CONFIRM |
| 7 | Handover to LTE | DL, other radio access technology (RAT) | Specific message may be needed because of the considering the size limitations in GSM HANDOVER TO UTRAN COMMAND |
| 8 | WTRU capability information compact | UL, other RAT | Specific message may be needed because of the considering the size limitations in GSM INTER RAT HANDOVER INFO |
| 9 | DL direct transfer | DL-SCH | Specific message with no AS integrity (if required) DOWNLINK DIRECT TRANSFER |
| 10 | UL direct transfer | UL-SCH | Specific message with no AS integrity (if required) UPLINK DIRECT TRANSFER |

As shown above, the RRC connection change command groups together a number of commands, (e.g., Setup and Reconfiguration, security mode commands and measurement commands). There are currently no groupings for failure messages. The only failure message is the use of an RRC Connection Change Failure command to indicate Message Failure. Grouping of such messages would require additional factors to be considered, especially in the case of the radio connection change command and the radio connection change complete.

Even though a separate RRC "Connection Change Failure" message has been disclosed, groups of messages, such as security and setup or measurement control and handover, raise a number of issues. One issue is whether the complete procedure fails if one part of the message fails. For example, the radio bearer setup part might fail while the security part passes, or the handover part might pass while the measurement control part might fail. Another issue is the determination of which combination of scenarios the procedure be declared a success. Therefore, there exists a need for a method and apparatus for handling grouped command messages.

SUMMARY

A method and apparatus for radio resource control (RRC) messaging. A method in a wireless communication system including receiving, at a wireless transmit/receive unit (WTRU) an RRC change command including a plurality of commands from a Node B and receiving, at the Node B, an RRC change response from the WTRU, wherein the RRC change command includes a command for performing a measurement gap configuration procedure and a command for performing a measurement gap activation procedure.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
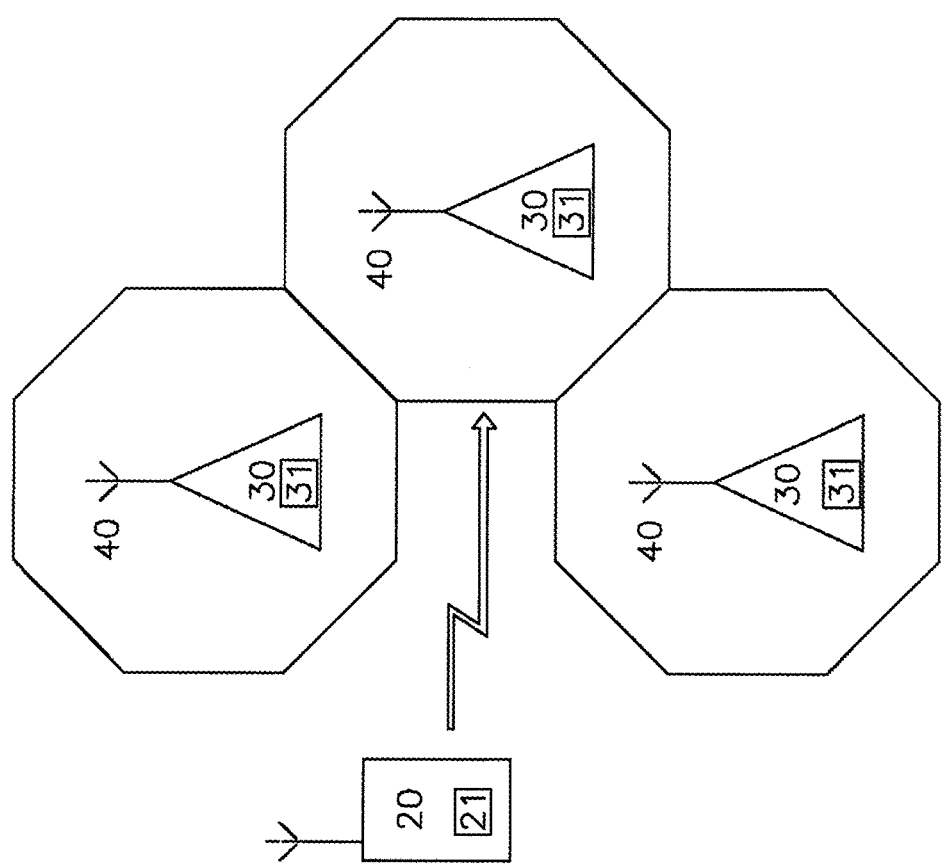
FIG. 1 is an example wireless communication system configured to implement the disclosed method.

Referring to FIG. 1, a LTE wireless communication network (NW) 10 comprises a WTRU 20, one or more Node Bs 30, and one or more cells 40. Each cell 40 comprises one or more Node Bs (NB or eNB) 30 including a processor 31. WTRU 20 comprises a processor 21. Processors 21 and 31 are configured to implement the disclosed method for handling grouped radio resource control (RRC) messages.

A method and apparatus are disclosed for handling partial failures or partial completes of grouped RRC message procedures, wherein such a failure by one of a plurality of procedures within the RRC message can be relayed to the NB without having to indicate a failure for all of the RRC procedures, including those that were successful.

In accordance with this method, when a WTRU 20 receives an RRC message, (e.g., a Radio Connection Change Command), processor 21 is forwarded the message for processing. For purposes of this disclosure, a Radio Connection Change Command may include a plurality of RRC commands. For example, a RADIO SETUP, RRC CONNECTION SET UP, RRC CONNECTION RELEASE may be included in the grouping of the RRC messages for the Radio Connection Change Command.

Figure 2:
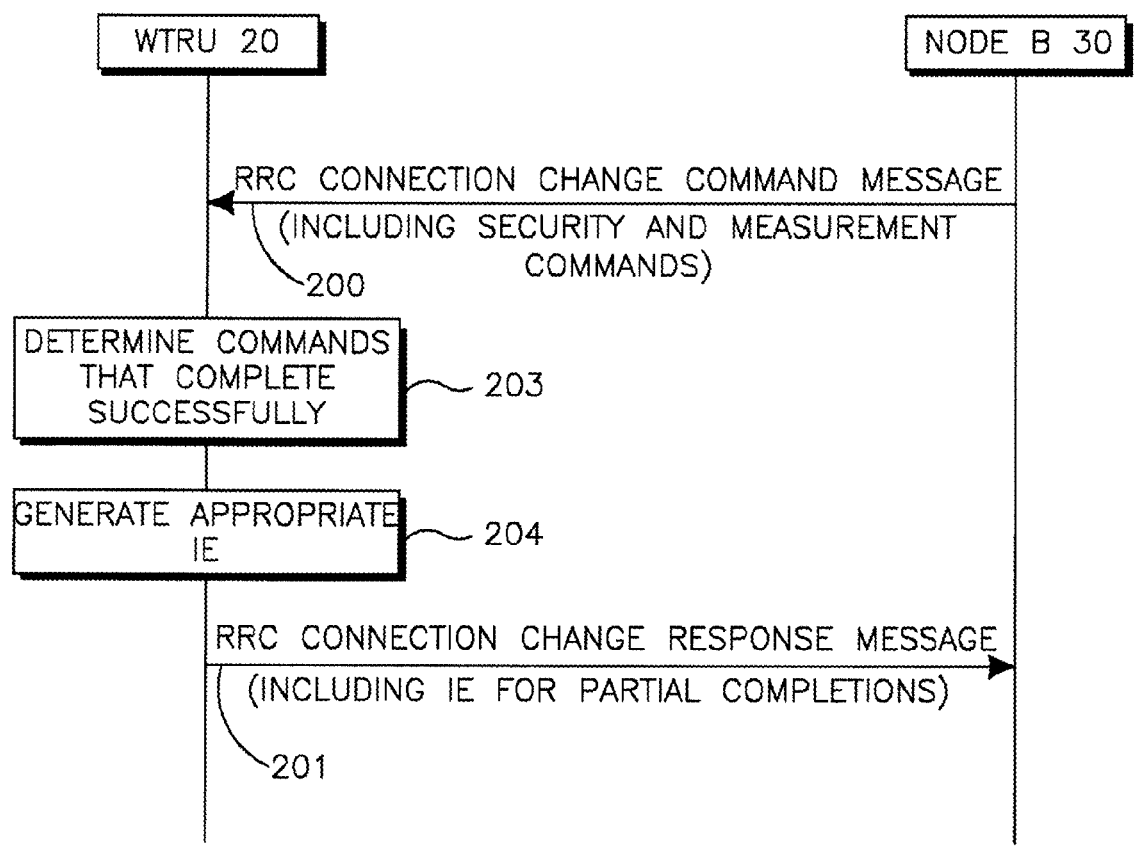
FIG. 2 is an example signal diagram of the disclosed method for handling Radio Resource Control (RRC) messages.

FIG. 2 is an example of a signal diagram for handling an RRC Radio Connection Change in accordance with the disclosed method. NB 30 sends an RRC Connection Change Command message 200, including a group of RRC commands, to WTRU 20. Upon receipt of message 200, processor 21 of WTRU 20 initiates the RRC reconfiguration and other procedures associated with each of the grouped RRC commands.

Processor 21 of WTRU 20 then monitors the status of each of the procedures that are being performed in response to message 200 to determine whether the respective procedure was successfully completed. Once a determination has been made by processor 21 regarding each procedure 203, processor 21 utilizes this information to generate an indication of whether message 200 was successfully completed in its entirety, partially completed, or failed to complete 204. In accordance with the disclosed method and apparatus, this information is included in an information element (IE) that may be included in a response message 201, (e.g., an RRC Connection Change Complete or an RRC Connection Change Failure).

The information relayed in the additional IE depends on the network configuration. For example, the presence of the IE may indicate to NB 30 that the RRC Message failed, partially or completely; that there was only a partial failure of the RRC Message; that the RRC Message completed, partially or completely. Alternatively, the IE may also indicate which procedure within the RRC Message failed, as well as the reason for the failure.

The IE, called "Failed Configuration" or any other name, may hold enumerated values, such as, "setup", "security", "measurement configuration", and the like. The failed configuration IE may also include a sub-IE called "failure cause", which may include any other information that is considered necessary and that may indicate the reasons for the failure. For example, if there is a partial failure of the procedure, the RRC "Connection Change Complete" message 201 including the IE may be sent to NB 30 and processed by NB processor 31, indicating which part of the configuration did not complete successfully.

Alternatively, in the case of a partial success, WTRU 20 may send an RRC "Connection Change Failure" message 201 including an IE called "Configuration Completed", for example, or another name that is suitable. This Configuration Completed IE may hold similar enumerated values such as, "setup", "security", or "measurement configuration," which indicates whether part of the configuration completed successfully. Within the IE "Configuration Completed" there may be sub-IEs, which may include the information from current "setup complete" or "security mode complete" commands, the uplink ciphering activation time info or the start values, for example.

In another alternative, when there is a partial success in the configuration, the RRC "Connection Change Complete" message 201, as well as details of the configuration that succeeded may be sent with an IE designated as "Partial Reconfiguration" or any other name that is considered suitable. In accordance with this alternative, the "Partial Reconfiguration" IE may have a "true" or "false" value, which indicates whether another message is set to follow. If the IE is set to true, the RRC "Connection Change Complete" message 201 may be followed by the RRC "Connection Change Failure" message which may include details of the failed configuration.

Alternatively, the reverse may be done for a partial reconfiguration. The RRC "Connection Change Failure" message 201 may be sent first with details of the failed configuration, along with an IE designated as "Partial Reconfiguration", or any other name that is considered suitable, which may be followed by a RRC "Connection Change Complete" message with details of the configuration that completed successfully.

Alternatively, if a configuration is partially successful, a RRC "Connection Change Failure" message may be sent and no information may be configured. Such an action, however, may not be beneficial as the combining of messages leads to a higher chance of failure since all parts of the configuration would be expected to pass.

In accordance with the disclosed method, an example partial configuration may include a situation where the RRC "Connection Change Command" 200 carries both security mode information and radio bearer setup information. Where there is some failure, such as a physical channel failure, the radio bearer setup cannot be completed successfully, but the security procedure is able to complete successfully. In this case, there is a partial configuration because, the security procedure would pass but the radio bearer setup information would fail.

Another example may be if a handover is being performed and the RRC "Connection Change" command 200 includes both handover information and measurement control information. A failure may occur, for example, an invalid configuration, wherein the measurement parameters may not be successfully configured, but the handover may still be successful.

In another example, the handover may not be successfully completed, but the measurement parameters are successfully configured. Successful measurement control configuration, though, may not need a confirmation message. As such, an RRC "Connection Change Failure" message is sent to NB 30, including, an IE designated as "Configuration Completed" with a value "measurement" such that the network does not need to send the measurement control information again.

In accordance with the disclosed method, some instances of partial reconfiguration may not be allowed. For example, where an RRC "Connection Change Command" message including both security mode information and radio bearer setup information encounters a failure, such as an invalid configuration, the security mode command parameters may not be configured. As a result of the detection by processor 21 of the security mode failure, an RRC "Connection Change Failure" command is sent to NB 30, thereby preceding configuration of the radio bearers. This prevents a situation where the data is ready to be sent, but no security is enabled.

By way of another example, the "security capability" information sent as part of the security information may not match a WTRU's capability information. If this should occur, WTRU 20 sends a failure for the entire message and does not configure anything. There may be other scenarios where it might be better to send a failure message and not configure anything.

Alternatively, the network may signal the measurement control or the security mode information in the handover, setup or reconfiguration messages with an IE indicating that the configuration of the measurement or any other such information is optional. WTRU 20 may then configure the information or not configure the information based on its own constraints, such as receiving an invalid configuration or wanting to do a faster handover, for example. WTRU 20 could signal an RRC "Connection Change Complete" message with an optional IE, such as "Configuration Not Completed Value", or any other suitable name, wherein the value may be a measurement, a setup, or any value indicating the part of the configuration that was not complete. This may indicate to the network that the network should signal the incomplete configuration to WTRU 20 again. Also, if there are any parameters in the optional configuration information, such as measurement control, which the WTRU 20 may not have understood and therefore may not complete the configuration, WTRU 20 may also indicate that as part of the RRC Connection Change command.

If a complete success of the configuration is detected by processor 21, an RRC "Connection Change Complete" message 201 sent without the IE included. An indication that none of the commands in the RRC "Connection Change Command" message could be configured, may be sent in a RRC "Connection Change Failure" message without the IE "Configuration Completed".

In an alternative disclosed method, the measurement control and security control information are included in a IE included in a setup or reconfiguration message, for example.

Since the security and the measurement control information are allowed to be transmitted separately as a different RRC "Connection Change" command, rather than coupling the information with the setup, reconfiguration, handover or any other command, an "Information included" IE is included within the RRC "Connection Change" command. This IE indicates to WTRU 20 whether the measurement control and security information is embedded in the message. The "Information Included" IE may be an enumerated field and hold values for security information, measurement control information, and the like. The inclusion of such an IE in the RRC "Connection Change" command may assist WTRU 20 with preparing to receive additional messages.

In another alternative, when information for different purposes is combined, such as security and setup information, each of them may carry separate activation times. In accordance with this alternative, WTRU 20 stores the two separate activation times. In some cases, the activation times may be combined and WTRU 20 would enable the entire configuration at one specified activation time. Alternatively, when combining measurement control with setup/handover/reconfiguration information, the measurement identifier may preferably be carried so that further modification to the measurement information may be made by using the proper identifier.

If messages are being combined, common information elements, such as integrity check information, for example, may be combined.

In earlier Universal Mobile Telephone System (UMTS) releases, the IE "DPCH Compressed Mode Info" was part of many reconfiguration/setup messages. "DPCH Compressed Mode Status" IE was part of the measurement control information. This IE allows the measurement control message to activate the compressed mode, but not configure it. In this case, before WTRU 20 receives the measurement control command with the gap activation command, WTRU 20 may need to receive the compressed mode gap parameters through the reconfiguration message. Although there are measurement gaps in place of compressed mode in LTE, the restriction of some messages being only able to activate the gap but not be able to configure it is removed. All the measurement gap parameters may be combined into one common set, such as "Measurement Gap Info." RRC messages could then use this set to configure and activate the measurement gap. In this case, the same RRC message may simultaneously configure and activate the gap for WTRU 20, thereby simplifying the configuration procedure.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless communication system, the method comprising:
   receiving, at a wireless transmit/receive unit (WTRU) a radio resource control (RRC) change message including a plurality of information element (IE) values from a Node B;
   receiving, at the Node B, an RRC change response from the WTRU; and
   wherein the RRC change message includes an IE indicative of performing a measurement gap configuration procedure and an IE indicative of performing a measurement gap activation procedure.

2. The method of claim 1, wherein the RRC change message includes a plurality of measurement gap parameters.

3. The method of claim 2, wherein the measurement gap parameters are combined into a common set.

4. The method of claim 1, wherein the RRC change response includes an information element (IE), wherein the IE indicates whether the procedure was successfully completed in its entirety, the procedure was partially completed, or the procedure failed to complete.

5. A wireless communication system comprising:
   a receiver in a wireless transmit/receive unit (WTRU) configured to receive a radio resource control (RRC) change message including a plurality of information element (IE) values from a Node B;
   a receiver in the Node B configured to receive an RRC change response from the WTRU; and
   wherein the RRC change message includes an IE indicative of performing a measurement gap configuration procedure and an IE indicative of a command for performing a measurement gap activation procedure.

6. The wireless communication system of claim 5, wherein the RRC change message includes a plurality of measurement gap parameters.

7. The wireless communication system of claim 6, wherein the measurement gap parameters are combined into a common set.

8. The wireless communication system of claim 5, wherein the RRC change response includes an information element (IE) wherein the IE indicates whether the procedure was successfully completed in its entirety, the procedure was partially completed, or the procedure failed to complete.

9. A method for use in a wireless transmit/receive unit (WTRU), the method comprising:
   receiving a radio resource control (RRC) change message from a Node B, wherein the RRC change message includes an information element (IE) indicating both a measurement gap configuration procedure and a gap activation procedure;
   performing the measurement gap configuration procedure based on the received RRC change message;
   performing the measurement gap activation procedure based on the received RRC change message; and
   transmitting an RRC change complete response to the Node B.

10. The method of claim 9 wherein the RRC change message includes a plurality of measurement gap parameters.

11. The method of claim 10 wherein the measurement gap parameters are combined into a common set.

12. The method of claim 9 wherein the RRC change complete response indicates for each measurement gap configuration procedure, whether the measurement gap configuration procedure was successfully completed in its entirety, the measurement gap configuration procedure was partially completed, or the measurement gap configuration procedure failed to complete.

13. A wireless transmit/receive unit (WTRU), the WTRU comprising:
   a receiver configured to receive a radio resource control (RRC) change message from a Node B, wherein the RRC change message includes an information element (IE) indicating both a measurement gap configuration procedure and a gap activation procedure;
   the WTRU configured to perform the measurement gap configuration procedure based on the received RRC change message;
   the WTRU configured to perform the measurement gap activation procedure based on the received RRC change message; and
   a transmitter configured to transmit an RRC change complete response to the Node B.

14. The WTRU of claim 13 wherein the RRC change message includes a plurality of measurement gap parameters.

15. The WTRU of claim 14 wherein the measurement gap parameters are combined into a common set.

16. The WTRU of claim 13 wherein the RRC change complete response indicates for each measurement gap configuration procedure, whether the measurement gap configuration procedure was successfully completed in its entirety, the measurement gap configuration procedure was partially completed, or the measurement gap configuration procedure failed to complete.

* * * * *